United States Patent [19]

Dumont

[11] 4,274,651
[45] Jun. 23, 1981

[54] WHEELCHAIR

[76] Inventor: Hubert H. Dumont, 2543 Lincoln Ave., Miami, Fla. 33133

[21] Appl. No.: 65,182

[22] Filed: Aug. 9, 1979

[51] Int. Cl.³ .............................................. B62M 1/14
[52] U.S. Cl. ............................ 280/242 WC; 280/232; 280/250; 192/93 R
[58] Field of Search ........... 280/242 WC, 242 R, 249, 280/250, 230, 233, 234, 224, 225; 192/93 B, 93 R, 93 C

[56] References Cited

U.S. PATENT DOCUMENTS

| | | | |
|---|---|---|---|
| 953,118 | 3/1910 | Boutell | 192/93 R |
| 1,600,131 | 9/1926 | Overton | 280/242 WC |

FOREIGN PATENT DOCUMENTS

| | | | |
|---|---|---|---|
| 217692 | 1/1910 | Fed. Rep. of Germany | 280/250 |
| 1391141 | 1/1965 | France | 280/250 |

Primary Examiner—John A. Pekar
Attorney, Agent, or Firm—Dressler, Goldsmith, Shore, Sutker & Milnamow, Ltd.

[57] ABSTRACT

A hand-propelled wheelchair for riding upon sidewalks and ramps without rolling backwards or abruptly changing directions. The wheelchair has at least one, and preferably a pair of cam-actuated manual drive assemblies. Each manual drive assembly has a drive mechanism, which preferably takes the form of sprockets and a flexible chain drive. The manual drive assembly also includes a clutch and a rotatable hand crank with a cam thereon for engaging the clutch and drive mechanism. The hand crank and cam are movable from a drive position to a free-wheeling position. An auxiliary exercise assembly is provided to exercise the feet of the person sitting in the wheelchair when the hand crank is rotated in the free-wheeling position.

18 Claims, 8 Drawing Figures

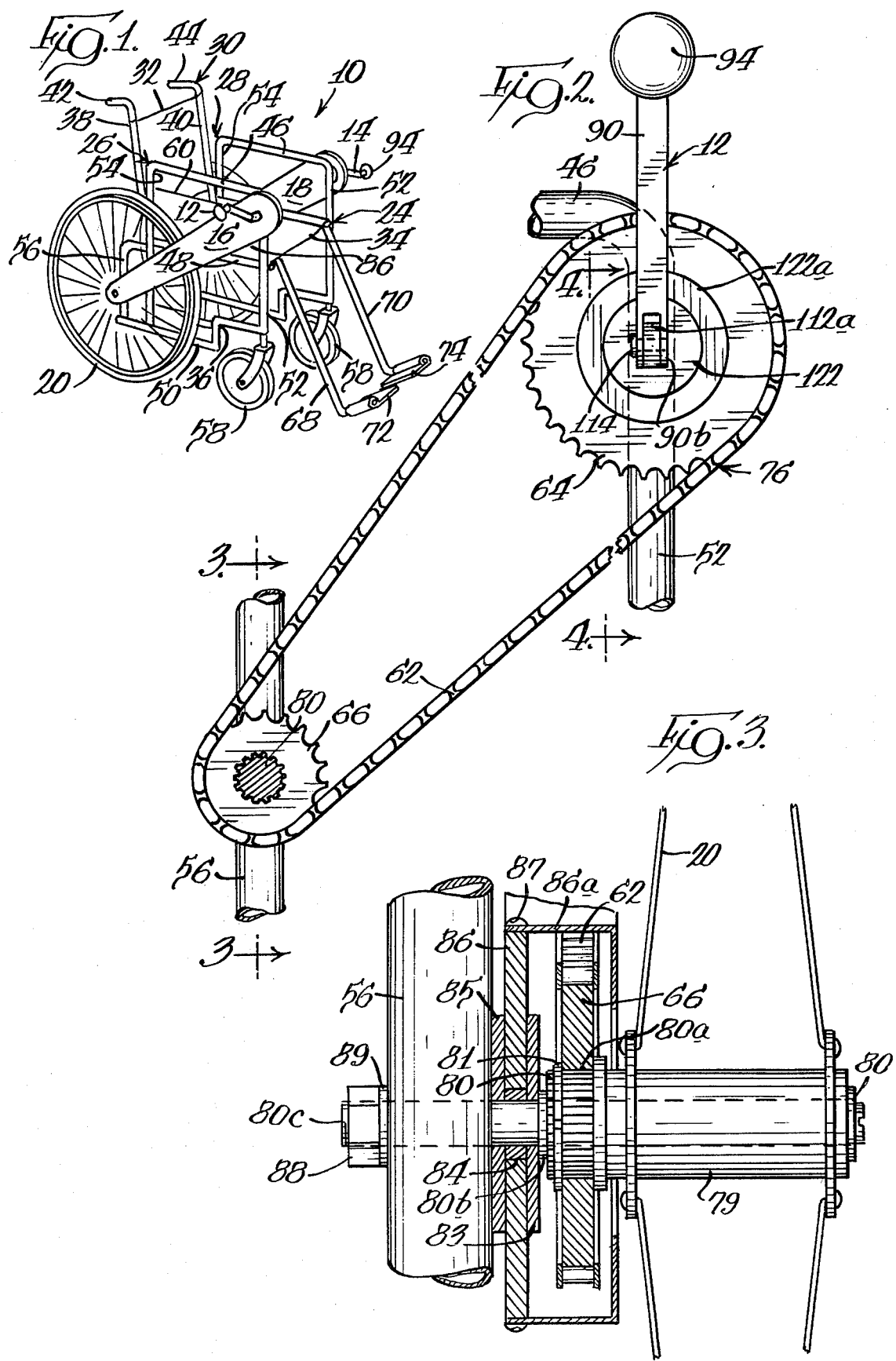

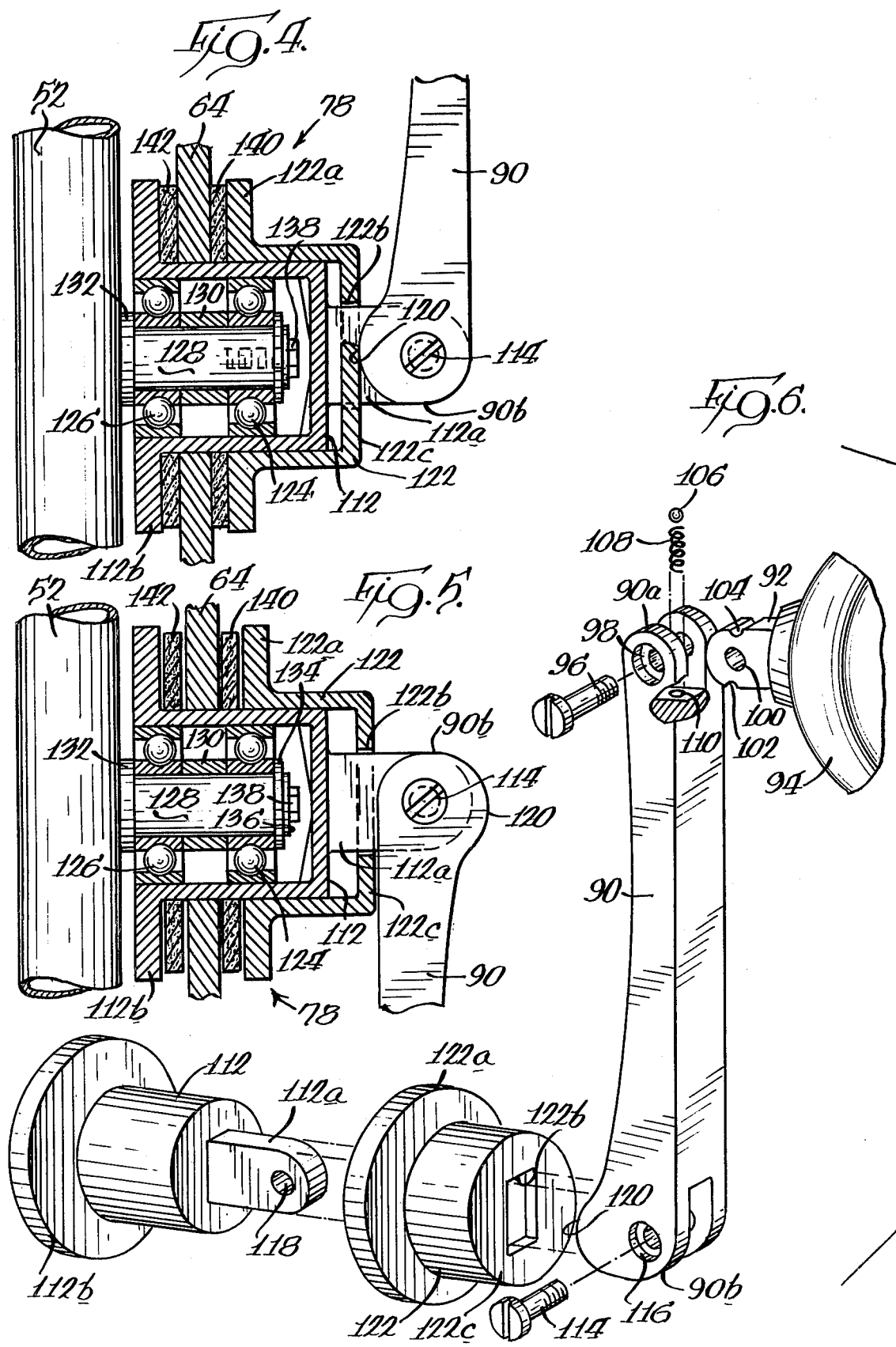

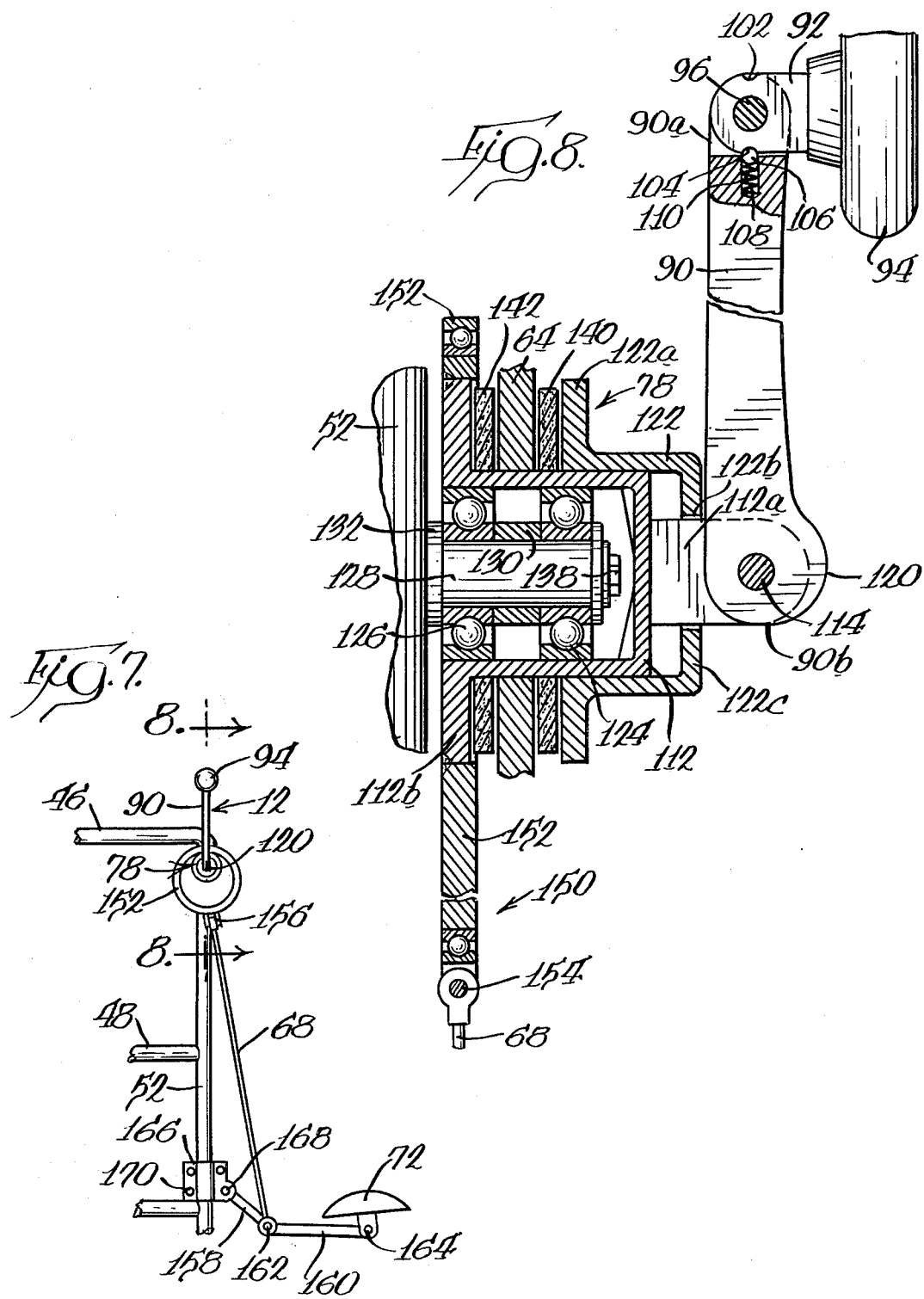

WHEELCHAIR

BACKGROUND OF THE INVENTION

This invention relates to wheelchairs, and more particularly, to hand-propelled wheel chairs.

Over the years a variety of wheelchairs have been developed to aid paraplegics and hospital patients. Typifying these wheelchairs and similar devices are those shown in U.S. Pat. Nos. 91,602, 882,248, 1,687,812, 2,576,413 and 3,107,105. These prior art wheelchairs have met with varying degrees of success.

Conventional hand-propelled wheelchairs that are in common use today, typically require a repetitive two-stroke action to permit the paraplegic or patient to manually drive the wheelchair. The repetitive two-stroke action consists of a power stroke, in which the user forcefully pushes the rims of the rear wheels forwardly to propel the wheelchair, and a return stroke or recovery stroke, in which the user reaches rearwardly and grabs the rims of the rear wheels. The power stroke requires a strenuous twisting action of the wrists which may result in injury. The return stroke produces no power in the wheelchair, even though the paraplegic or patient is working, which is inefficient and wasteful. Furthermore, during the return stroke, the wheelchair can lose momentum, abruptly change directions on uneven surfaces and roll backwards while climbing a ramp. This is very dangerous.

It is therefore desirable to provide an improved wheelchair which overcomes most, if not all, of the preceding disadvantages.

SUMMARY OF THE INVENTION

A hand-propelled wheelchair is provided for safely transporting persons, such as paraplegics and patients, in a sitting position, which does not substantially roll backwards while climbing a ramp or abruptly change directions on uneven surfaces. Advantageously, the wheelchair operates on a generally continuous manual power stroke that substantially avoids loss of momentum and power during its operation.

One of the many advantages of the present invention is that many types of conventional wheelchairs that are in common use today, can be readily converted to incorporate the features of the present invention.

The inventive wheelchair has a frame assembly with a pair of generally upright side frames, a back frame with a generally upright back support and a seat that extends between and connects the side frames. A plurality of wheels, including a pair of front wheels and a pair of rear wheels, are operatively connected to the frame assembly for traveling upon a surface such as a ramp. In the preferred form, each of the rear wheels have a diameter substantially greater than each of the front wheels.

In order to manually drive the wheelchair and substantially prevent the wheelchair from rolling backwards while climbing a ramp or abruptly changing directions on an uneven surface, a manual drive assembly is operatively connected to the frame assembly. The manual drive asembly includes a driven member, such as a sprocket, that is rotatably coupled to the wheel that is to be driven. A drive member, such as driven sprocket, is operatively connected to the driven member, such as by a flexible drive chain. A rotatable hand crank is positioned adjacent one of the side frames of the wheelchair at a location to permit the person and the wheelchair to comfortably rotate the crank. The rotatable hand crank has a cam and a handle. A clutch assembly is provided that is responsive to the cam to drivingly connect the hand crank to the drive member.

In use, the cam is movable by the handle from a drive position to cammingly engage the clutch assembly to drive the driven wheel, to a neutral free-wheeling position that is spaced from the clutch assembly to permit the driven wheel to coast. Preferably, the rotatable hand crank has a pivotable handle that pivots from a drive position to a free-wheeling position.

In order to exercise the legs of the person riding the wheelchair, the wheelchair can include an exercise assembly. The exercise assembly is responsive to the rotatable hand crank when the crank is in the free-wheeling position. In the illustrative embodiment, the exercise assembly includes at least one foot pedal and an eccentric member that is operatively connected to the foot pedal to move the foot pedal when the crank is rotated in the free-wheeling position.

A more detailed explanation of the invention is provided in the following description and appended claims taken in conjunction with the accompaying drawings.

BRIEF DESCRIPTION OF THE DRAWINGS

FIG. 1 is a perspective view of a wheelchair in accordance with principles of the present invention;

FIG. 2 is an enlarged broken side view of portions of a manual drive assembly of the wheelchair;

FIG. 3 is an enlarged cross-sectional view of portions of the wheelchair taken substantially along line 3—3 of FIG. 2;

FIG. 4 is a side view of portions of the manual drive assembly in a drive position, taken substantially along line 4—4 of FIG. 2;

FIG. 5 is a side view, similar to FIG. 4, of portions of the manual drive assembly, but in a free-wheeling position;

FIG. 6 is an exploded perspective view of portions of the manual drive assembly;

FIG. 7 is a fragmentary front view of an optional exercise assembly for the wheelchair; and FIG. 8 is an enlarged broken cross-sectional view of portions of the drive assembly and exercise assembly, taken substantially along line 8—8 of FIG. 7, when the rotatable hand crank is in the free-wheeling position.

DETAILED DESCRIPTION OF THE ILLUSTRATIVE EMBODIMENT

Referring to FIG. 1 of the drawings, a hand-propelled wheelchair 10 is provided for smoothly and safely transporting persons, such as paraplegics and patients along sidewalks, ramps, corridors, etc. As explained in greater detail below, the wheelchair is readily propelled by rotatable handcranks 12 and 14 of manual drive assemblies 16 and 18, respectively, without substantially losing momentum. The positive drive of manual drive assemblies 16 and 18, when cranks 12 and 14 are manually engaged and held, substantially prevents the wheelchair 10 from rolling backwards while climbing a ramp or from abruptly changing directions on an uneven surface. Hand cranks 12 and 14 can be operated in a continuous, uninterrupted manner for smooth delivery of power to the wheels 20.

Wheelchair 10 (FIG. 1) has a frame assembly 24 for supporting the person in the wheelchair in a sitting position. The frame assembly includes a pair of generally upright side frames 26 and 28, a back frame 30 with a generally upright back support 32, and a seat 34 that extends between and connects side frames 26 and 28. In the illustrative embodiment side and back frames 26, 28 and 30 are made of interconnected, bent and welded tubular elements 36. Tubular elements 36 are preferably made of impact-resistant lightweight metal, such as aluminum.

Back frame 30 has a pair of upright elongated post-like members 38 and 40 with rearwardly extending hand grips 42 and 44, respectively. Back support 32 is preferably made of flexible canvas material and extends between and connects post-like members 38 and 40.

Each side frame 26 and 28 has a fixed upper arm rest 46, an intermediate seat-supporting brace 48 and a lower brace 50 which extend between, connect and rigidify front and rear vertical legs 52 and 54. In some circumstances, it may be desirable that arm rest be removable to permit side transfer (ingress and egress) of the patient into and out of the wheelchair. In the illustrative embodiment, each side frame 26 and 28 has a back leg or shorter rear leg 56 (FIG. 1) that is connected to elongated rear leg 54. Back legs 56 are connected to spoked rear wheels 20 and front legs 52 are connected to front wheels or casters 58. Preferably, each of the rear wheels 20 has a diameter substantially greater than each of the front wheels 58. For some models, rear wheels 20 can be attached to rear legs 54 and back legs 56 can be eliminated for economy of material.

Each side frame 26 or 28 has a flexible side wall or barrier 60 (FIG. 1) which is positioned above intermediate brace 48 and extends between front and rear legs 52 and 54 to substantially prevent the person in the wheelchair from inadvertently touching the chain 62 (FIG. 2) and sprockets 64 and 66 of manual drive assemblies 16 and 18. Barrier 60 also serves as a shield to substantially prevent gravel or other material that may be kicked up from wheels 20 and 58 from hitting the person sitting in the wheelchair.

In the illustrative embodiment, seat 34 (FIG. 1) is made of flexible fabric, such as canvas, and extends between and is connected to intermediate braces 48 of side frames 26 and 28. The front of wheelchair 10 has elongated connecting rods 68 and 70 (FIG. 1), which are inclined outwardly and downwardly, with foot pedals or supports 72 and 74, respectively, that are connected thereto.

Manual drive assemblies 16 or 18 (FIG. 1) propel and control the speed of rear wheels 20. In the illustrative embodiment, rear wheels 20 are not rotatably coupled to each other and are each independently driven by their own manual drive assembly 16 or 18. While the embodiment shown in FIG. 1 is preferred, it may be desirable in some circumstances that the rear wheels be rotatably coupled to each other to rotate in unison and that the wheelchair be powered by a single manual drive assembly. The latter system can be augmented by a differential device and steering mechanism.

Each drive assembly 16 or 18 (FIG. 1) has a rotatable hand crank 12 or 14, a flexible drive mechanism or subassembly 76 (FIG. 2) and a clutch 78 (FIGS. 4, 5 and 8). Flexible drive mechanism 76 includes a drive sprocket 64 (FIG. 2) that is operatively connected to hand crank 12 or 14 about a common axis of rotation provided by shaft 114, a driven sprocket 66 that is operatively connected to its associated rear wheel 20 by hub 79 about a common axis of rotation provided by spindle or axle pin 80, and a flexible drive chain 62 that connects sprocket 64 and 66. In the illustrative embodiment, drive sprocket 64 has a larger diameter and a greater number of teeth than driven sprocket 66 so that one rotation of drive sprocket 64 will result in more than one rotation of driven sprocket 66, but in some circumstances it may be desirable, that sprockets 64 and 66 be of the same diameter and have the same number of teeth, or that driven sprocket 66 have a larger diameter and more teeth than drive sprocket 64.

As shown in FIG. 3, driven sprocket 66 is fixedly connected to rear wheel 20. This can be accomplished by using an internally splined driven sprocket 66 and holding sprocket 66 in place on the splined portions 80a of a spindle 80 with spring ring or split ring 81 or by keying driven sprocket 66 and rear wheel to spindle 80. Spindle 80 has a shoulder 80b against which is placed a first disc or flange 83. A bushing 84 is positioned between first disc 83 and a second disc or flange 85. A base plate or cover plate 86 is seated upon bushing 84. Base plate 86 has a channel portion 86a secured by screws 87 that provide top, bottom and side portions which cover chain 62 and sprockets 64 and 66 to prevent the operator from accidentially touching the moving chain and sprockets. For fixed arm rests 46, base plate 86 is fixedly secured about bushing 84. When the wheelchair is equipped with removable arm rest, base plate 86 pivots or rotates about bushing 84, without wobbling, after the top of base plate 86 has been released from shaft 114 by quick-release device (not shown). The threaded end 80c of spindle 80 is secured to leg 56 by a nut 88 and lock washer 89. In some circumstances, it may be desirable to use a clamp and bracket arrangement for fixed arm rests in lieu of the arrangement described above.

Rotatable hand crank 12 or 14 (FIG. 1) of each drive assembly 16 and 18 has an elongated arm 90 (FIGS. 6 and 8) with an outer bifurcated clevis end 90a and an inner bifurcated clevis end 90b. Outer bifurcated clevis end 90a is pivotally connected to finger 92 of knob-shaped handle 94 via a pivot pin 96 through the pivot pin-receiving openings 98 and 100 of outer end 90a and finger 92. Finger 92 has a pair of diametrically opposed recesses or grooves 102 and 104, including a drive position recess 102 (FIG. 6) and a free-wheeling position recess 104 (FIG. 8), which lockably receives detent or ball 106. Detent 106 is urged into the recesses by a sprng 108 seated in spring-receiving chamber 110 of outer arm end 90a. This arrangement permits the handle 94 to be pivoted from a drive position (FIG. 6) to a free wheeling position (FIG. 8).

Inner bifurcated clevis end 90b of crank arm 90 is pivotally connected to the toe 112a (FIGS. 4-6) of tubular drive hub 112 via pivot pin 114 through the pivot-pin receiving openings 116 and 118 of inner bifurcated end 90b and 112a. The inner end 90b of crank arm 90 has a knuckle-shaped, convex rounded cam 120 to actuate clutch 78 and drive mechanism 76 in a manner described below. Hand cranks 12 and 14 are identical, and reference hereinafter to crank 12 also applies to crank 14.

As shown in FIGS. 4-6, drive hub 112 has an inner annular flange or abutment flange 112b. Socket or bell 122 provides a drive member that is telescopically slidably positioned upon hub 112. Socket 122 has a ring-restraining annular flange or drive flange 122a, a rectangular opening 122b to receive toe 112a of drive hub 112 and a cam-engaging abutment surface 122c. Hub 112 rotates about ball bearings 124 and 126 which are secured to stationary shaft 128 and separately by a spacer or bushing 130. Stationary shaft 128 is secured to leg 52, such as by welding. A collar 132 on shaft 118 spaces bearing 126 from leg 52. A snap ring 134, cap or washer 136 and bolt 138 (FIG. 5) are mounted upon the outer end of shaft 128 to prevent bearing 124 from moving off shaft 128. Shaft 128 is located at a position closely adjacent the corner or junction of arm rest 46 and front leg 52 to comfortably position hand crank 12 for rotation.

Drive sprocket 64 (FIG. 6) is rotatably and slidably positioned upon the exterior surface of hub 112 at a location between the inward end 90b of crank arm 12 and the hub's abutment flange 112b. Slidably positioned on hub 112 between drive sprocket 64 and ring-restraining flange 122a of socket 122b is an outer friction ring 140. An inner friction ring 142 is slidably positioned on hub 112 between drive sprocket 64 and abutment flange 112b.

Clutch assembly 78, therefore, includes drive hub 112, drive member (socket) 120, friction rings 140 and 142, bearings 124 and 126 and shaft 114.

When crank 12 and its cam 120 are pivoted to a drive position as shown in FIG. 4, cam 120 wedgingly and cammingly engages abutment surface 122c of drive member 120 causing drive member 118 and its drive flange 122a to move inward toward the hub's abutment flange 112b, to compress and firmly hold friction rings 140 and 142 and drive sprocket 64 in compressive, clamping engagement between drive flange 122a and abutment flange 112b. Thus, drive member 122 will cause outer friction ring 140 to move inwardly into abutting engagement against drive sprocket 64, which will in turn slide inwardly and move into abutting engagement against inner friction ring 142. Inner friction ring 142 will slide inwardly and move against the hub's abutment flange 112b.

As crank 12 or 14 is rotated in the drive position as shown in FIG. 4, crank 12, hub 112, drive member 118, rings 140 and 142 and drive sprocket 64 will rotate together, driving chain 62 and driven sprocket 66 to drive rear wheel 20.

When crank 12 is pivoted to a neutral free-wheeling position as shown in FIG. 5, cam 120 is moved out of engagement with drive member 122. This will release drive sprocket 64, rings 140 and 142, drive flange 122a and abutment flange 112b from driving engagement with each other so that they freely rotate and slip upon shaft 128 as hand crank 12 is rotated. Thus, rotation of hand crank 12 in the free-wheeling position will disengage drive mechanism 76 and permit the rear wheel 20 to free-wheel or glide.

When crank 12 is in the free-wheeling position, handle 94 can be pivoted from the drive position as shown in FIG. 6, to the free-wheeling position as shown in FIG. 8 for comfortable rotation of the crank in the free-wheeling position.

In order to exercise the legs of the person riding the wheelchair when the crank is rotated in the free-wheeling position, wheelchair 10 includes an auxiliary exercise assembly or passive leg exerciser 150 (FIGS. 7 and 8) connected to each manual drive assembly 16 or 18. The exercise assembly 150 associated with each manual drive assembly 16 or 18 is identical, and reference to exercise assembly 150 in FIGS. 7 and 8 with respect to crank 12, connecting rod 68 and foot pedal 72, apply to connecting crank 14 (FIG. 1), connecting rod 70 and foot pedal 74. Exercise assembly 150 is not shown in FIG. 1.

Exercise assembly 150 (FIGS. 7 and 8) has an eccentric roller bearing member 152 that is eccentrically and rotatably positioned about shaft 128. Eccentric member 152 is positioned upon and detachably connected to the hub's abutment flange 112b, such as with bolts or clips, to fixedly rotate with hub 112. In some circumstances it may be desired to weld eccentric member 152 to abutment flange 112b.

The outer end of eccentric member 152 (FIGS. 7 and 8) is pivotally connected to the upper end of elongated connecting rod 68 via connecting pin 154 (FIG. 8) and wing nut 156 (FIG. 7). The lower end of connecting rod 68 is pivotally connected to the outer end of link or rod 158 (FIG. 7) and the inner end of foot bar 160 by bottom pin 162. Foot pedal 72 is pivotally connected to the outer end of foot bar 160 by pedal pin 164. The inner end of link 158 (FIG. 7) is pivotally connected to mounting bracket 166 by bracket pin 168. Bracket 166 is secured to the lower end of front leg 52 by bolts 170.

When crank 12 is rotated in the freewheeling position as shown in FIGS. 7 and 8, connecting rod 68 and foot pedal 72 will reciprocate generally vertically to exercise the foot of the person sitting in the wheelchair.

Leg exerciser 150 works whether the crank is rotated in the drive position or in the free-wheeling position. In order to disengage the leg exerciser, wing nut 156 and pin 154 are removed to separate connecting rod 68 from eccentric member 152. As an alternative, connecting rod can be arranged to slide up and down an upper sleeve (not shown) adjacent pin 154 when wing nut 156 is loosened.

The wheelchair assembly of the present invention offers many advantages. This multipurpose drive assembly provides improved mobility for paraplegics and offers them a viable alternative to the limitations of conventional hand-propelled wheelchairs. The convenient positioning of the handcranks makes it unnecessary for the wheelchair operator to reach back and grasp the drive-rim in order to propel the chair. As discussed above, the hand cranks are located away from the drive wheels at a position where the operator's arm and shoulder muscles can be used to better advantage. This not only produces more power, but reduces fatigue as well, allowing the operator to move faster for longer periods of time, while expending less energy. The present invention also offers a greater latitude of design. For example, the wheelbase can be extended and the center of gravity lowered if desired.

Another feature of the present invention is that the clutch assemblies permit the operator to "freewheel" the hand cranks into synchronization along their cranking perimeter. This allows the operator the choice of cranking alternately with his hands diametrically opposed to each other, as in pedaling a bicycle, or jointly in unison at the same level and relative position on the cranking perimeter to apply even more power when needed, such as propelling up from a dip or over a hump. The cranks also provide a steadier and more continuous delivery of power to the drive wheels than the conventional two-stroke action of prior art wheelchairs.

Furthermore, the present invention offers a wide range of manufacturing, fabrication and design alternatives, such as the use of molded plastics, expanded foams and lightweight metal alloys, not heretofore used with conventional wheelchairs. Moreover, the construction and arrangement of the drive assembly in cooperation with the other parts and components of the subject wheelchair, provides a safer, speedier, more comfortable, more versatile and less tiring wheelchair than most prior art wheelchairs.

If desired, the wheelchair can have a longer wheelbase, a lower center of gravity and a semi-recumbent shell-like frame assembly with steering dampeners to prevent front caster wheel flutter. The continuous control of the drive wheels, the steering dampeners and longer wheelbase provides even faster movement upon bike paths, boardwalks and other open areas.

While the manual drive assemblies of the subject wheelchair are preferably driven by flexible chains and sprockets, in some circumstances it may be desirable to drive the wheelchair with flexible belts and rollers or with intermeshing gears. Furthermore, various size sprockets can be used together on the wheelchair, in a manner similar to 10-speed bicycles and the like, to selectively vary the speed of the wheelchair.

Although embodiments of the present invention have been shown and described, it is to be understood that various modifications and substitutions can be made by those skilled in the art without departing from the novel spirit and scope of the invention.

What is claimed:

1. A hand-propelled wheelchair for transporting persons, such as paraplegics and patients, in a sitting position, comprising:
   a frame assembly having a pair of generally upright side frames, a back frame including a generally upright back support and a seat extending between and connecting said side frame;
   a plurality of wheels operatively connected to said frame assembly for traveling upon a surface such as a ramp, said wheels including a pair of front wheels and a pair of rear wheels, each of said rear wheels having a diameter substantially greater than each of said front wheels; and
   manual drive means operatively connected to said frame assembly for manually driving at least one of said rear wheels and for substantially preventing said rear wheel from rolling backwards while climbing said ramp, said manual drive means including:
      a driven sprocket operatively connected to one of said rear wheels, said driven sprocket and said rear wheel rotating together about a common axis of rotation,
      a drive sprocket for driving said driven sprocket,
      a flexible chain connecting said drive sprocket to said driven sprocket,
      a rotatable hand crank positioned adjacent one of said side frames at a location for permitting the person in the wheelchair to comfortably rotate said crank, said hand crank having an arm, a cam integrally connected to one end of said arm, and a handle connected to the other end of said arm for rotating said cam integrally with said arm, and
      clutch means responsive to said cam for drivingly connecting said hand crank to said drive sprocket,
      said cam being moveable by said handle from a drive position for cammingly engaging said clutch means to drive said rear wheel, to a neutral free-wheeling position spaced from said clutch means for permitting said rear wheel to coast.

2. A hand-propelled wheelchair for transporting persons, such as paraplegics and patients, in a sitting position, comprising:
   a frame assembly having a pair of generally upright sides frames, a back frame including a generally upright back support and a seat extending between and connecting said side frames;
   a plurality of wheels operatively connected to said frame assembly for traveling upon a surface such as a ramp, said wheels including a pair of front wheels and a pair of rear wheels, each of said rear wheels having a diameter substantially greater than each of said front wheels;
   manual drive means operatively connected to said frame assembly for manually driving at least one of said rear wheels and for substantially preventing said rear wheel from rolling backwards while climbing said ramp, said manual drive means including:
      a driven sprocket operatively connected to one of said rear wheels, said driven sprocket and said rear wheel rotating together about a common axis of rotation,
      a drive sprocket for driving said driven sprocket,
      a flexible chain connecting said drive sprocket to said drive sprocket,
      a rotatable hand crank positioned adjacent one of said side frames at a location for permitting the person in the wheelchair to comfortably rotate said crank, said hand crank having a cam and a handle, and
      clutch means responsive to said cam for drivingly connecting said hand crank to said drive sprocket,
      said cam being movable by said handle from a drive position for cammingly engaging said clutch means to drive said rear wheel, to a neutral free-wheeling position spaced from said clutch means for permitting said rear wheel to coast, said drive sprocket defining a hub-receiving opening,
      said clutch means including a hub having a portion with a maximum diameter slightly less than said hub-receiving opening for rotating within said drive sprocket when said crank is rotated in the neutral free-wheeling position,
      said crank being pivotally connected to said hub adjacent said cam,
      said clutch means further having a socket providing a drive member with a drive flange and a cam-engaging abutment surface for engagement by said cam when said cam is in said drive position,
      said hub having an abutment flange, and
      said drive sprocket being positioned intermediate said drive flange of said drive member and said abutment flange of said hub.

3. A hand-propelled wheelchair in accordance with claim 2 wherein said clutch means includes at least one friction ring for engaging said drive sprocket when said cam is in said drive position.

4. A hand-propelled wheelchair in accordance with claim 2 further including:
   an eccentric member positioned upon and connected to the abutment flange of said hub for rotation therewith,
   a connecting rod connected to said eccentric member, and a foot pedal assembly operatively connected to said connecting rod and driven by said eccentric member for exercising the leg of the person riding said wheelchair when said crank is rotated in the neutral free-wheeling position.

5. A hand-propelled wheelchair for transporting persons, such as paraplegics and patients, in a sitting position, comprising:

a frame assembly having a pair of generally upright side frames, a back frame including a generally upright back support and a seat extending between and connecting said side frames;

a plurality of wheels operatively connected to said frame assembly for traveling upon a surface such as a ramp, said wheels including a pair of front wheels and a pair of rear wheels, each of said rear wheels having a diameter substantially greater than each of said front wheels;

manual drive means operatively connected to said frame assembly for manually driving at least one of said rear wheels and for substantially preventing said rear wheel from rolling backwards while climbing said ramp, said manual drive means including:

a driven sprocket operatively connected to one of said rear wheels, said driven sprocket and said rear wheel rotating together about a common axis of rotation, a drive sprocket for driving said driven sprocket, a flexible chain connecting said drive sprocket to said driven sprocket, a rotatable hand crank positioned adjacent one of said side frames at a location for permitting the person in the wheelchair to comfortably rotate said crank, said hand crank having a cam and a handle, and clutch means responsive to said cam for drivingly connecting said hand crank to said drive sprocket, said cam being moveable by said handle from a drive position for cammingly engaging said clutch means to drive said rear wheel, to a neutral free-wheeling position spaced from said clutch means for permitting said rear wheel to coast, said crank having an elongated arm extending between and connecting said cam and said handle, and said handle is pivotally connected to said arm.

6. A hand-propelled wheelchair for transporting persons, such as paraplegics and patients, in a sitting position, comprising:

a frame assembly having a pair of generally upright side frames, a back frame including a generally upright back support and a seat extending between and connecting said side frames;

a plurality of wheels operatively connected to said frame assembly for traveling upon a surface such as a ramp, said wheels including a pair of front wheels and a pair of rear wheels; and manual drive means operatively connected to said frame assembly for manually driving at least one of said wheels, and for substantially preventing said driven wheel from rolling backwards while climbing said ramp, said manual drive means including a driven member rigidly coupled to said driven wheel and a drive member operatively connected to said driven member, a rotatable hand crank positioned adjacent one of said side frames at a location for permitting the person in said wheelchair to comfortably rotate said crank, said rotatable hand crank having an arm, a cam integrally connected to one end of said arm, and a handle connected to the other end of said arm for rotating said cam integrally with said arm, and clutch means responsive to said cam for drivingly connecting said hand crank to said drive member, said cam being movable by said handle from a drive position for cammingly engaging said clutch means to drive said driven wheel, to a neutral free-wheeling position spaced from said clutch means for permitting said driven wheel to coast.

7. A hand-propelled wheelchair in accordance with claim 6 wherein said manual drive means further includes flexible drive means operatively connecting said drive means to said driven member.

8. A hand-propelled wheelchair in accordance with claim 7 wherein:

said flexible drive means includes a chain, said driven member includes a driven socket, and said drive member includes a drive sprocket.

9. A hand-propelled wheelchair in accordance with claim 6 wherein said handle comprises a pivotable handle.

10. A hand-propelled wheelchair in accordance with claim 6 further including exercise means connected to said clutch means for exercising at least one leg of the person riding said wheelchair.

11. A hand-propelled wheelchair for transporting persons, such as paraplegics and patients, in a sitting position, comprising:

a frame assembly having a pair of generally upright side frames, a back frame including a generally upright back support and a seat extending between and connecting said side frames;

a plurality of wheels operatively connected to said frame assembly for traveling upon a surface such as a ramp, said wheels including a pair of front wheels and a pair of rear wheels;

manual drive means operatively connected to said frame assembly for manually driving at least one of said wheels, and for substantially preventing said driven wheel from rolling backwards while climbing said ramp, said manual drive means including a driven member rigidly coupled to said driven wheel and a drive member operatively connected to said driven member, a rotatable hand crank positioned adjacent one of said side frames at a location for permitting the person in said wheelchair to comfortably rotate said crank, said rotatable hand crank having a cam and a handle, and clutch means responsive to said cam for drivingly connecting said hand crank to said drive member, said cam being movable by said handle from a drive position for cammingly engaging said clutch means to drive said driven wheel, to a neutral free-wheeling position spaced from said clutch means for permitting said driven wheel to coast; and exercise means including at least one foot pedal assembly, a connecting rod connected to said foot pedal assembly, and an eccentric member operatively connected to said connecting rod and to said clutch means for moving said foot pedal assembly when said crank is rotated in the free-wheeling position.

12. A hand-propelled wheelchair for transporting persons, such as paraplegics and patients, in a sitting position, comprising:

a plurality of wheels including a pair of front wheels and a pair of rear wheels for traveling upon a surface such as a ramp, each of said rear wheels having a diameter substantially greater than each of said front wheels;

a frame assembly having a pair of generally upright side frames, a back frame including a generally upright back support and a seat extending between and connecting said side frames, each of said side frames having a front leg operatively connected to said front wheels, a rear leg operatively connected to one of said rear wheels, and an armrest;

manual drive means connected to each of said side frames for manually driving the rear wheel of said side frame and for substantially preventing said rear wheel from rolling backwards while climbing said ramp, said manual drive means including a driven sprocket operatively connected to said rear wheel, said driven sprocket and said rear wheel rotating together along a common axis of rotation, a drive sprocket for driving said driven sprocket, a flexible chain connecting said drive sprocket to said driven sprocket, a shaft secured to said front leg, at least one bearing secured to said shaft, a hub rotatably positioned upon said bearing, said hub having an abutment flange spaced generally adjacent and rotatable relative to said front leg, a socket providing a drive member telescopically and slidably positioned upon said hub, said drive member having a drive flange and a cam-engaging abutment surface, said drive sprocket slidably and rotatably positioned upon said hub between said drive flange of said drive member and said abutment flange of said hub, an outer friction ring slidably positioned upon said hub between said drive flange of said hub and said drive sprocket, an inner friction ring slidably positioned upon said hub between said drive sprocket and said abutment flange of said hub, a hand crank having a handle at one end and a cam at the other end, said handle being positioned at a location for permitting the person in the wheelchair to comfortably rotate said crank, said hand crank pivotally connected to the outer end of said hub adjacent said cam for rotating said hub, and said hand crank being pivotable from a drive position in which said cam engages said cam-engaging abutment surface of said drive member for driving said rear wheel, to a neutral free-wheeling position in which said cam is spaced from said drive member for permitting said rear wheel to coast.

13. A hand-propelled wheelchair in accordance with claim 12 wherein said crank has an elongated arm extending between and connecting said cam and said handle, and said handle is pivotally connected to said arm and pivotable from a drive position to a free-wheeling position.

14. A hand-propelled wheelchair in accordance with claim 13 wherein:

said handle has a finger with a pair of diametrically opposed recesses, including a drive position recess and a free-wheeling position recess;

said arm defines a spring-receiving chamber;

a detent for lockably engaging said recesses; and a spring seated in said spring-receiving chamber for urging said detent into one of said recesses.

15. A hand-propelled wheelchair in accordance with claim 14 wherein said arm has an outer bifurcated end for receiving said finger of said handle.

16. A hand-propelled wheelchair in accordance with claim 13 including a cover plate for substantially covering said manual drive means, except for said handle and said arm of said crank.

17. A hand-propelled wheelchair in accordance with claim 14 further including:

a member eccentrically positioned on and secured to said abutment flange of said hub for rotation therewith, a pedal assembly having a bar and a foot pedal connected to one end of said bar, a connecting rod connecting said eccentric member to the other end of said bar, and said foot pedal being reciprocally driven by said eccentric member when said crank is rotated in the neutral free-wheeling position to exercise the leg of the person riding the wheelchair.

18. A hand-propelled wheelchair in accordance with claim 17 including a bracket mounted upon said front leg, and a link having one end pivotally connected to the other end of said bar adjacent said connecting rod and another end pivotally connected to said bracket.

* * * * *

UNITED STATES PATENT OFFICE
CERTIFICATE OF CORRECTION

Patent No. 4,274,651        Dated June 23, 1981

Inventor(s) Hubert H. Dumont

It is certified that error appears in the above-identified patent and that said Letters Patent are hereby corrected as shown below:

Column 10, line 21, "driven socket" should be --driven sprocket--.

Signed and Sealed this

Twenty-second Day of September 1981

[SEAL]

Attest:

Attesting Officer

GERALD J. MOSSINGHOFF

Commissioner of Patents and Trademarks

UNITED STATES PATENT OFFICE
CERTIFICATE OF CORRECTION

Patent No. 4,274,651         Dated   June 23, 1981

Inventor(s)  Hubert H. Dumont

It is certified that error appears in the above-identified patent and that said Letters Patent are hereby corrected as shown below:

Column 10, line 21, "driven socket" should be --driven sprocket--.

Signed and Sealed this

Twenty-sixth Day of January 1982

[SEAL]

*Attest:*

GERALD J. MOSSINGHOFF

*Attesting Officer*     *Commissioner of Patents and Trademarks*